Oct. 28, 1969  A. M. ROWE, JR  3,474,635
DESALINATION BY FLASH FREEZING WITH $CO_2$
Filed Jan. 16, 1967
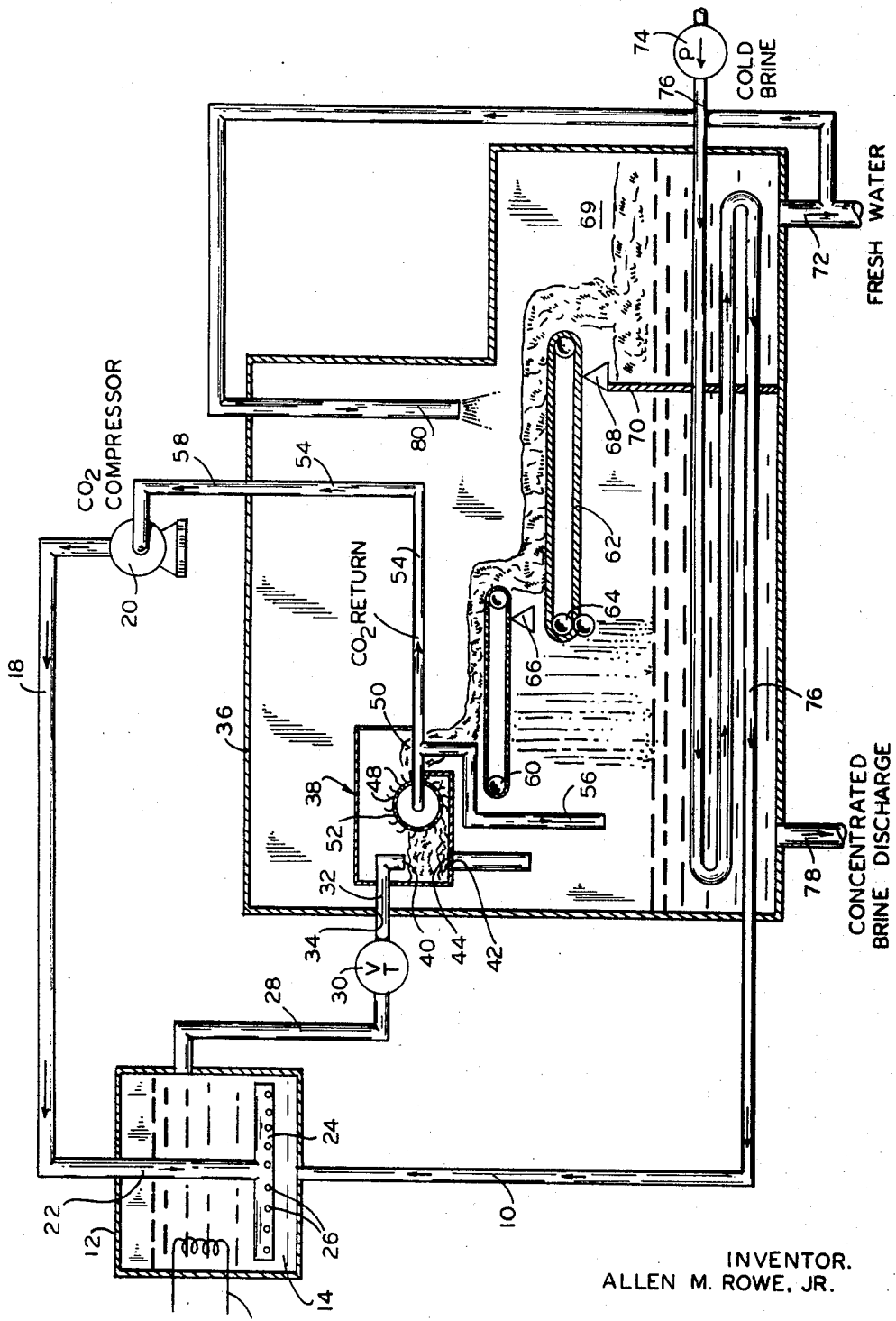
INVENTOR.
ALLEN M. ROWE, JR.
BY *Head & Johnson*
ATTORNEYS

United States Patent Office 3,474,635
Patented Oct. 28, 1969

3,474,635
DESALINATION BY FLASH FREEZING WITH CO₂
Allen M. Rowe, Jr., 126 Southwest, Apt. 8,
Stillwater, Okla. 74074
Filed Jan. 16, 1967, Ser. No. 609,501
Int. Cl. B01d 9/04
U.S. Cl. 62—58                5 Claims

ABSTRACT OF THE DISCLOSURE

A process for the desalination of sea water comprising cooling the sea water by indirect heat exchange under high pressure carbonation until ice crystals begin to form then flashing the cooled, carbonated solution through a throttling valve to substantially atmospheric pressure within a separation tank in which a large part of the saline solution freezes to substantially pure ice crystals and the remainder of the saline solution becomes a concentrated brine solution. The ice crystals are separated from the concentrated brine solution by passage over a porous conveyor belt to an adjoining chamber where the ice crystals melt and pass from the separation tank. Incoming brine is cooled by indirect heat exchange passage through the melting chamber and separation by passage through the separation tank by indirectly contacting the melting ice and the collected concentrated brine before the saline solution enters the cooling tank.

---

This invention relates to a means and method for the preparation of potable water from saline water. More particularly, this invention relates to a means and method for preparing potable water from saline solutions by freezing. Still more particularly, this invention relates to a means and method for preparing potable water from sea water by separation of a portion of the water as ice.

The primary object of this invention is to obtain potable water from water of high mineral content with high efficiency.

Still another object of this invention is to provide a means and method for producing potable water from saline water in large quantities and at low cost.

Still another object of this invention is to provide a means and method for obtaining potable water from saline water by operation of a means and method adapted to be continuous.

These and other objects of the invention will become apparent from the following description and claims, and from the accompanying drawing, wherein:

The single figure illustrates a preferred embodiment of the invention.

The invention comprises cooling a saline solution by indirect means in a cooling zone under high pressure carbon dioxide until ice crystals begin to form, then flashing the cooled solution through a throttling valve to a non-pressurized separation zone in which ice crystals form from a portion of the saline solution and carbon dioxide is released from the solution, then separating the ice crystals from the other solution by depositing the ice crystals upon a porous and compressible conveyor belt to permit adhering water to be removed from the ice crystals, then conveying the ice crystals to a melting zone from which the resulting potable water is removed.

Referring now to the figure in detail, an aqueous solution, such as sea water or brine, passes through line 10 into a pressurizable cooling tank 12 in which the aqueous solution is permitted to accumulate to a controllable volume. Aqueous solution 14 is cooled by indirect heat exchange contact with a refrigerant passing through coils 16. Refrigerant passing through coils 16 is cooled by any conventional external refrigerating means not shown in the figure. Pressurized carbon dioxide is passed through line 18 after being compressed in compressor pump 20, and enters tank 12 by the connection of line 18 with a sparger 22 which has its lower arm 24 positioned near the bottom of tank 12 so that the pressurized carbon dioxide may pass from the sparger 22 through outlets 26. Positioning the sparger outlets near the bottom of tank 12 permits the pressurized carbon dioxide to bubble through the aqueous solution with better contact and distribution throughout the solution. Cooling and carbonation of the aqueous solution in tank 12 occur simultaneously and progress to a state at which small ice crystals begin to form in the aqueous solution at the given conditions of temperature and pressure. The pressurized solution is drawn from tank 12 through line 28 which communicates with a throttling valve 30. The upstream side of throttling valve 30 in line 28 is subject to the pressure conditions extant in tank 12, and the downstream side of throttling valve 30 which communicates with line 32, is under pressure conditions which are substantially atmospheric. The sudden release of the pressure upon the aqueous solution as it leaves throttling valve 30 causes the carbon dioxide to suddenly come out of the solution and be converted to the gaseous phase. The sudden release of dissolved carbon dioxide from the solution to the gaseous phase provides violent agitation to the solution which brings about the formation of many quickly formed small ice crystals rather than a few slowly formed large crystals. The sudden release of the carbon dioxide from the solution causes the formation of many small bubbles of gas which form the nucleation sites for the formation of the small ice crystals. The ice crystals formed are, of course, of substantially pure water, and the remaining liquid brine now has a higher salt concentration than the initial aqueous solution. The slush which is composed of the ice crystals and brine flows through line 32 through an inlet 34 into a non-pressurized tank 36, and then into a gravity separation tank 38 contained within tank 36. Tank 36 is non-pressurized by reason of the fact that it is maintained at atmospheric pressure, although the interior of tank 36 is liquid sealed from the atmosphere so that the least carbon dioxide gas contained therein may be recirculated to the system.

Gravity separation tank 38 provides a means for the initial separation of the ice crystals from the concentrated brine. The slush formed in the ice crystals and brine is deposited in tank 38 from outlet 40 of line 32 and builds up in tank 38 with the ice crystals floating on top of the brine. The liquid brine moves to the bottom of the tank 38 and exits from tank 38 through outlet 42 in the bottom of tank 38 which is covered by a screen 44 to prevent the ice crystals from being flushed out with the brine. The brine then falls to the bottom of the tank 36 where it is held in indirect heat exchange relationship with incoming aqueous solution to provide initial cooling for the aqueous solution entering tank 12 through line 10. Ice crystals in tank 38 are removed from tank 38 by motion of a rotating drum 46 which removes the ice from tank 38 by action of the curved blades extending from the surface of the drum. Ice crystals carried by the curved blade 48 are deposited through outlet 50. As the ice crystals are carried by blades 48, a portion of the carbon dioxide released within tank 38 is drawn through the ice crystals and throughout perforations 52 in the curved surface of drum 46. The carbon dioxide gas passing through the ice crystals on drum 46 carries with it a portion of the brine adhering to the ice crystals, and the carbon dioxide gas and brine pass from the interior of drum 46 through line 54. Line 54 includes a drain line 56 for the brine leading down through the bottom of tank 36. Line 54 continues through the exterior wall of tank 36 where it communicates with line 58 which in turn communicates with the inlet of pump 20.

Thus, after equilibrium conditions are approached for the carbon dioxide gas within tank 36, the carbon dioxide gas collecting in tank 36 leaves through the perforations in drum 46 and is recirculated.

Ice crystals from tank 38 are deposited upon a first conveyor belt 60 which carries the ice crystals a short distance within tank 36 so that additional brine adhering thereto may drain away from the crystals. Preferably, conveyor belt 60 would have perforations therein so that the draining and filtering away of concentrated brine from the ice crystals may be accomplished efficiently. From conveyor belt 60 the ice crystals are deposited upon a second conveyor belt 62 which is made of a porous and flexible material so that additional brine may be removed from the ice crystals both by the action of gravity and by the capillary forces exerted by the material of the conveyor belt. Conveyor belt 62 passes through a pair of rollers 64 which remove absorbed brine from the conveyor belt and permit the brine to collect in the bottom of tank 36. A scraper 66 may be positioned beneath and abutting conveyor belt 60 to remove adhering ice crystals, and another scraper 68 may be positioned beneath one portion of conveyor belt 62 also to remove adhering ice crystals. The ice crystals are carried from conveyor belt 62 to a melting compartment 69 in tank 36 formed by the position of wall 70 which separates the melting ice crystals from the concentrated brine on the other side of the walls. As the ice crystals melt in chamber 69, substantially pure water leaves the chamber through line 72. The water collecting in the lower portion of chamber 69 is used for cooling by indirect heat exchange means incoming aqueous solution being pumped from a source, such as the ocean, by means of pump 74 and line 76. Line 76 then continues through the lower portion of chamber 69 and passes through wall 70, whereas line 76 forms a means for carrying the aqueous solution of seawater through concentrated brine collected in the other compartment of tank 36 for additional cooling before the concentrated brine leaves tank 36 through line 78. At the exterior wall of tank 36 line 76 communicates with line 10 leading to tank 12. It can be seen, of course, that, preferably, line 76 is in heat exchange relationship first with the liquefied pure water in chamber 69, then subsequently with the concentrated brine, because the pure water in chamber 69 should be at a higher temperature than the concentrated brine, although the heat exchange lines may be suitably directed as regard to the two liquids as may best be determined by the temperature gradient between the two liquids, the pure water and the concentrated brine.

In operation, an aqueous solution such as seawater or brine is lead into tank 12 and is cooled to approximately 25° F. By reason of the prior passage of the aqueous solution in heat exchange relationship with pure water in chamber 69 or brine collecting in tank 36, the aqueous solution in line 10 may be of variable temperature. As the external refrigerant is supplied to coils 16 to lower the temperature of the solution, carbon dioxide is supplied to the solution through sparger 22 so that a pressure of approximately 500 lbs. p.s.i.g. is reached. Under these conditions ice crystals begin to form in the aqueous solution. Then throttle valve 30 is adjusted so that the pressurized solution passes from tank 12 to tank 36 where the solution is suddenly exposed to pressure substantially atmospheric. With this sudden release of pressure, the carbon dioxide is released from the solution and the initial carbon dioxide bubbles provide nucleation sites for the ice crystals which then form. The ice crystals form rapidly and are of small sizes, factors which provide for increased purity of the crystals and a high throughput for the system. After initial separation of the ice crystals from the brine or conveyor belt 60, the ice crystals may be washed with a spray of purified water taken from line 72 and emanating within the tank 36 by means of spray line 80. The concentrated brine in tank 36 and the purified water in chamber 69 of tank 36 are retained as long as possible within their compartments so that they leave at the highest suitable temperature after having been in heat exchange contact with aqueous solution within line 76.

If desired, the heat exchanger relationship of line 76 with purified water in chamber 69 may be omitted so that instead of the production of purified water, the product may be the ice crystals themselves. Thus, the recovery of potable water may be terminated at the step at which the ice crystals may be produced and before the ice is melted, so that the product may be used for such purposes as for artificial snow on ski slopes because of the small size of the ice crystals formed.

It should be kept in mind that the temperature and pressures mentioned herein are by way of examples only and not limitations of the invention. Generally speaking, the ice making efficiency of the invention improves with higher pressures and the selection of the pressure of operation is a question of engineering, that is, a question of constructing a system wherein the maximum efficiency is achieved at a minimum of cost.

In order to improve the effectiveness of washing away salt water which may adhere to the exterior of the ice crystals the surface tension of the water may be decreased by adding chemicals, such as detergents.

While the invention has been described as related to the derivation of potable water from salt water, obviously the invention may be equally as well utilized for producing ice from fresh water. In addition, the invention may be utilized for concentrating solutions, such as fruit juice and the like, by removal of water in the form of ice crystals. Gas is utilized in the invention for the purpose of permitting sub-cooling. While carbon dioxide is specified in the exemplification other gases may be used within the purview of the invention. Since the gas in the system functions in a closed process other gases more expensive than carbon dioxide may be used.

While the invention has been described with a certain degree of particularity it is manifest that many changes may be made in the details of construction and the arrangement of components without departing from the spirit and scope of this disclosure.

I claim:
1. A process for recovering potable water from an aqueous solution comprising the steps of:
  (a) carbonating said aqueous solution under pressure in a cooling zone,
  (b) cooling said carbonate aqueous solution while still under pressure in said cooling zone by pasing a refrigerant through said aqueous solution in indirect heat exchange relationship to a temperature slightly above the freezing point at that particular pressure,
  (c) passing the pressurized aqueous solution through a throttling valve from said cooling zone to a non-pressurized separation zone in which ice crystals form in said aqueous solution and carbon dioxide is released from the solution.
  (d) separating said ice crystals from said aqueous solution by depositing said ice crystals upon a porous and compressible conveyor belt into which a portion of brine adhering to the ice crystals may be absorbed,
  (e) conveying said ice crystals to a melting zone in which said ice crystals are melted, and
  (f) removing substantially fresh water from said melting zone.

2. A process for recovering potable water from an aqueous solution as described in claim 1 wherein:
  said aqueous solution passes in heat exchange relationship with said fresh water in said melting zone and with said brine in said separating zone before entering said pressurized cooling zone.

3. A process for recovering potable water from an aqueous solution as described in claim 2 wherein:
    said aqueous solution passes first through said melting zone and then through said separating zone before entering said pressurized cooling zone.
4. A process for recovering potable water from an aqueous solution as described in claim 3 wherein:
    said carbon dioxide released from said aqueous solution in said separating zone is collected from said separating zone and recycled under pressure to said cooling zone.
5. A process for recovering potable water from an aqueous solution as described in claim 4 wherein:
    said aqueous solution is held in said pressurized cooling zone until temperature and pressure conditions are reached at which ice crystals begin to form.

References Cited

UNITED STATES PATENTS

| | | | |
|---|---|---|---|
| 2,780,281 | 2/1957 | Reinert | 62—58 |
| 2,821,304 | 1/1958 | Zarchin | 62—58 |
| 3,137,554 | 6/1964 | Gilliland et al. | 62—58 |
| 3,170,778 | 2/1965 | Roth | 62—58 |
| 3,217,505 | 11/1965 | Tuwiner | 62—58 |
| 3,232,218 | 2/1966 | Soussloff et al. | 62—58 |
| 3,259,181 | 7/1966 | Ashley et al. | 62—58 |
| 3,285,024 | 11/1966 | Dunn et al. | 62—58 |

NORMAN YUDKOFF, Primary Examiner

U.S. Cl. X.R.

99—79